Feb. 12, 1963 G. REVESZ 3,077,561
BRIDGE COMPENSATING CIRCUIT
Filed April 15, 1959
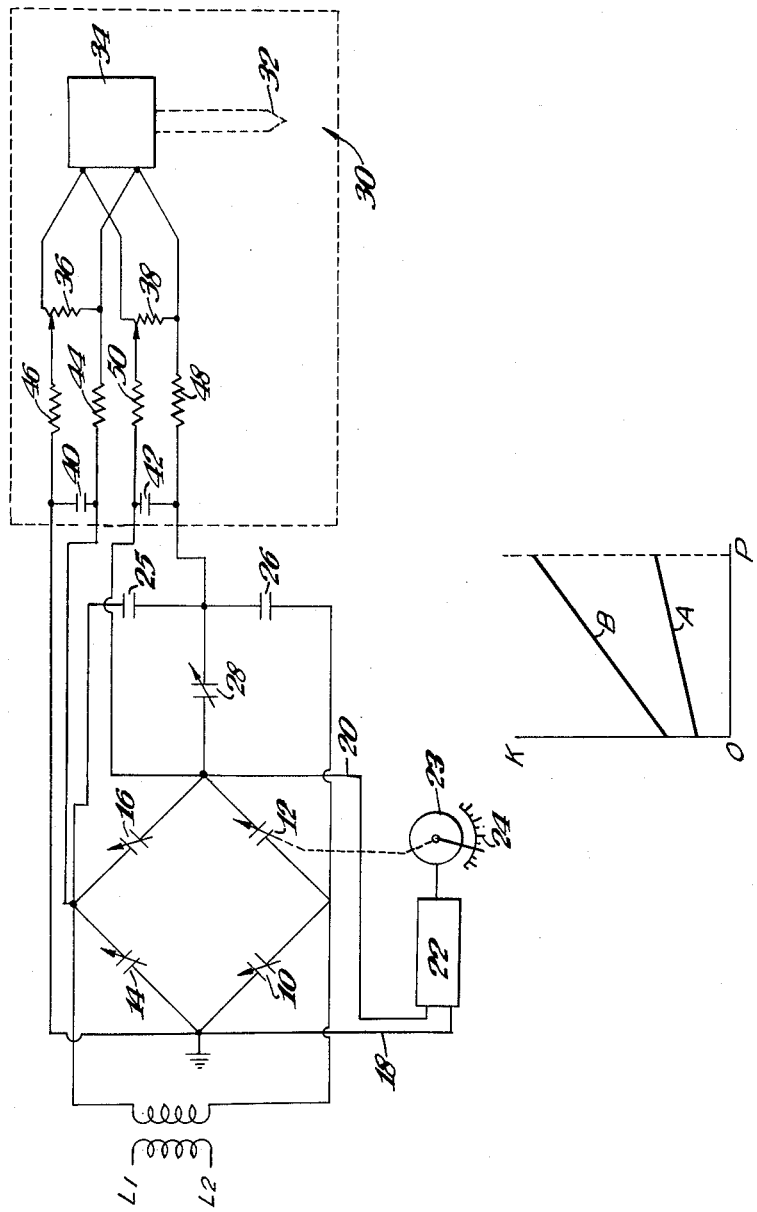

United States Patent Office 3,077,561
Patented Feb. 12, 1963

3,077,561
BRIDGE COMPENSATING CIRCUIT
George Revesz, Cheltenham, Pa., assignor to Robertshaw-Fulton Controls Company, Richmond, Va., a corporation of Delaware
Filed Apr. 15, 1959, Ser. No. 806,677
8 Claims. (Cl. 324—57)

This invention relates generally to electrical bridge circuits and more particularly to means and circuitry for compensating a bridge circuit against variations in secondary variables which affect accurate measurement of a primary variable to be measured by the bridge circuit.

Modern process instrumentation systems often utilize null-balance impedance bridges which may have a variable impedance arm responsive to variations in a primary process variable to be measured and/or controlled. The output of these bridge circuits is usually indicative of variations in the process variable and is usually amplified and applied to a suitable actuator which manipulates another variable impedance arm of the bridge circuit to produce a condition of bridge balance. The movement of the actuator, which is proportional to deviations in the process variable, may be additionally utilized to meter the process and/or initiate controlling action to minimize process variations.

The variable impedance arms utilized in the bridge circuits may take the form of a variable resistor, capacitor or inductor, depending upon the characteristics of the process variable, which may be in the form of mechanical movements, temperatures, fluid flows, moisture conditions, pressure variations, or the like. However, for example, if a particular impedance element, such as a variable resistor, is selected to be responsive to variations in the pressure condition of a vessel, secondary variables, such as process or ambient temperatures, at the vessel will affect the resistance of the variable resistor with the resultant disadvantage of introducing errors into the output of the bridge circuit.

Another example of the adverse affect of secondary variables upon the measurement of primary variables may be in a fabric drying operation. Here it is customary to pass a moving web of fabric between a pair of spaced plates which function as a sensing capacitor and which constitute the variable impedance arm of a bridge circuit. The capacitance of the sensing capacitor is caused to vary in response to variations in the moisture content of the fabric and, moreover, in response to variations in the temperature of the fabric to vary the output of the bridge circuit. Assuming that the output of the bridge circuit is utilized to measure only the moisture content of the fabric or the pressure condition of the vessel, as illustrated above, it is apparent that substantial errors may be introduced into these measurements as a result of the temperature variations in the fabric or in the vessel.

The present invention embodies circuitry for compensating bridge circuits against variations in these secondary variables which affect accurate measurement and/or control of the primary variable. An impedance bridge circuit is provided having one of the impedance arms responsive to variations in a primary variable to be measured and/or controlled and also to variations in a secondary variable which introduces errors into the measuring and/or controlling action of the bridge circuit. The bridge circuit further embodies impedance elements for independent adjustment of the zero and span settings thereof.

In the preferred embodiment of the invention, the impedance elements for zero and span adjustment may be in the form of variable capacitors which introduce a predetermined value of capacitance into the bridge circuit. Means in addition to the variable impedance arm are provided to be responsive only to variations in the secondary variable for producing variations in the capacitance of the zero and span adjusting capacitors to maintain a predetermined span and zero adjust of the bridge circuit.

Accordingly, it is an object of this invention to eliminate in an impedance bridge circuit for measuring a primary variable the effect of variations in a secondary variable which would otherwise influence measurement of the primary variable.

Another object of this invention is to maintain a predetermined zero and span adjustment of an impedance bridge circuit in response to variations in a secondary variable which influences measurement of a primary variable.

A further object of this invention is to vary the impedance of the zero and span adjustment means of an impedance bridge circuit in response to variations in a secondary variable which influences accurate measurement of a primary variable.

These and other objects and advantages will become apparent from the following description taken in connection with the accompanying drawing, wherein:

FIG. 1 is a schematic showing of an impedance bridge circuit for measuring variations in a primary variable and embodying the circuitry of the present invention, and FIG. 2 illustrates the effect of temperature upon the primary measured variable.

The impedance bridge circuit shown in FIG. 1 of the drawing comprises a plurality of impedance arms which, although not limited thereto, are shown as a plurality of capacitors 10, 12, 14, and 16. Capacitor 10 may be of any suitable form for detecting variations in a primary condition to be measured and/or controlled and for purposes of illustration will be considered to be in the form of a capacitor probe disposed to be responsive to variations in a moisture condition. The capacitors 12 and 14 may be of standard construction and variable in capacitance to provide means for rebalancing and adjusting the zero condition of the bridge circuit, respectively.

A suitable source of alternating potential L1, L2 is connected across the input terminals of the bridge circuit. As is well known in the art, the input signal will appear at the output terminals 18, 20 of the bridge circuit only during conditions of bridge unbalance due to variations in the capacitance of capacitor 10 and shifted in phase in one direction or another from its original phase condition depending upon the direction of bridge unbalance. The output signal may be utilized for any known purpose, such as to energize a suitable amplifier 22, the output of which is shown connected to a suitable actuator, such as motor 23. The capacitor 12 is operatively connected to motor 23 and manipulated in response to movement thereof to rebalance the bridge circuit. Additionally, a suitable appropriately calibrated indicator 24 may be operatively connected to the motor 23 to provide visual indication of the process variations in response to movement of motor 23.

The bridge circuit thus far described is of a fixed span, the zero setting of which may be adjusted by manipulation of the capacitor 14. The bridge circuit will be in a condition of balance, as is well known in the art, when the ratio of capacitance of the capacitors 10, 14 is equal to the ratio of capacitance of the capacitors 12, 16. In order to extend the useful range or span of the bridge circuit without necessitating the replacement of the capacitors in the bridge arms, impedance elements designated as capacitors 25, 26 and 28 are provided to vary the span of the bridge circuit. To this end, the capacitors 25, 26 may be of the same value and connected in series across the input terminals of the bridge circuit. The capacitor 28 is shown to be variable in capacity and having one plate connected to one of the output terminals of the bridge circuit and the other plate connected to the junction intermediate capacitors 25, 26.

It is apparent that the capacitors 25, 26, and 28 are connected in a Y network. If the value of capacitance of capacitor 25 is equal to the capacitance of capacitor 26, and considerably larger than the capacitance of capacitor 28, it may be shown in a manner well known in the art, that the Y network is equivalent to a delta network. The equivalent delta network would consist of three capacitors, two of them being equal in value of capacitance, each having a capacitance equal to approximately one-half of the value of capacitance of capacitor 28 and lying in shunt with capacitors 12 and 16, respectively. The third capacitor of the equivalent delta network would be connected across the input terminals of the bridge circuit and have a value of capacitance equal to approximately one-half of the value of capacitance of capacitors 25 and 26. Thus, it is apparent, manipulation of capacitor 28 varies the amount of capacitance in shunt with capacitors 12 and 16 to vary the percentage capacitance change required of the capacitor 12 to counteract a given percentage change in the capacitance of sensing capacitor 10 to restore bridge balance. The span of the bridge circuit is accordingly adjusted without affecting the zero adjustment of the bridge circuit as determined by the adjustment of capacitor 14.

Assuming now that the bridge circuit is to be placed into operation to meter the aforementioned moisture condition which may be the moisture content of a moving web of material which is being dried, the probe capacitor 10 may then take the form of a pair of spaced plates adapted to receive the web of material therebetween. Variations in the moisture content of the material will function to vary the dielectric constant of the capacitor 10 and, accordingly, the capacitance of capacitor 10. Since the capacitance of a capacitor is well known to be directly proportional to its dielectric constant, statements made hereinafter about the dielectric constant of the material will be equally applicable to the capacitance of capacitor 10 as well.

In order to calibrate the apparatus thus far described, the condition of minimum moisture is first produced in the material to adjust the capacitor 10 to its minimum capacitance condition. Thereafter, the zero adjustment capacitor 14 is adjusted in a manner to produce a zero or minimum value reading at the indicator 24. The maximum moisture condition is next produced in the material to adjust capacitor 10 to its maximum capacitance condition and then the span adjusting capacitor 28 is varied to produce a full scale or maximum reading at the indicator 24.

It is well understood that the dielectric constant of many materials (containing small amounts of moisture) can be represented by the following equation:

(1) $$K = K_m \cdot \left[ 1_n \frac{K_w}{K_m} \cdot P \cdot 1 \right]$$

where $K_m$ is the dielectric constant of the dry material;
$K_w$ is the dielectric constant of water;
$K$ is the resultant dielectric constant of the material; and
$P$ is the percentage of water in the material.

The resultant dielectric constant K of the material can be represented diagrammatically according to the above equation as a function of P, the percentage of water in the material, by the curve A in FIG. 2. The intersection of curve A with the vertical left and right hand axes of FIG. 2 may represent the minimum and maximum readings, respectively, at the indicator 24. Obviously, if $K_m$ and $K_w$ are insensitive to variations in temperature, the curve A would be applicable for measurements under varying temperature conditions. However, as is well known in the art, the dielectric constant of many materials is variable with variances in temperature and thus the slope of curve A will also vary with variations in temperature. For purposes of illustration, let it be assumed that $K_m$ and $K_w$ are temperature dependent, with $K_m$ varying at the rate of 0.1%° F. and the expression $$K_m \cdot 1_n \frac{K_w}{K_m}$$

in Equation 1, varying at the rate of 0.2%/° F. Assuming now that the temperature of the material varies 1° F., the minimum value of the curve A will vary at the rate of 0.1%/° F. and the slope of curve A will vary at the rate of 0.2%/° F. This change in minimum value and slope is represented by the curve B in FIG. 2, and, as is obvious therefrom, all readings at the indicator 24 will be clearly erroneous under varying temperature conditions at the material, due primarily to variations in its dielectric constant which varies the capacitance of capacitor 10.

It has been found that the slope of curve A can be maintained, as shown in FIG. 2, independent of varying temperature conditions at the material by proportionately varying the capacitance of the zero and span adjusting capacitors in response to these temperature variations. The circuitry intended for this purpose is indicated generally by the reference numeral 30 and includes a suitable temperature sensing element 32, disposed to be responsive to temperature variations at the material passing between the pair of spaced plates comprising the sensing capacitor 10. The temperature sensing element 32 may be of any suitable form well known in the art, such as a thermistor or thermocouple which will vary in resistance or in generated voltage, respectively, in response to the detected temperature variations. The output from temperature sensing element 32 is applied to the input terminals of a conventional amplifier 34 which is adapted to produce at its output terminals a D.C. voltage which is proportional to variations in temperature as sensed by the temperature sensing element 32.

The output from amplifier 34 is applied across a pair of potentiometers 36, 38 for application to a pair of impedance elements which are shown as capacitors 40, 42 and which are connected in parallel with the zero adjusting capacitor 14 and the span adjusting capacitor 28, respectively. To this end, one end of potentiometer 36 is connected to one plate of capacitor 40 by a resistor 44 and the sliding contact of potentiometer 36 is connected to the other plate of capacitor 40 by a resistor 46. One end of potentiometer 38 is similarly connected to one plate of capacitor 42 by a resistor 48 and the sliding contact of potentiometer 38 is connected to the other plate of capacitor 42 by a resistor 50. The resistors 44, 46, 48, and 50 are utilized to isolate the alternating current in the impedance bridge circuit from the amplifier 34 and temperature sensing element 32. Resistors 44, 46, 48, and 50 may be of a relatively high magnitude of resistance in that during normal operation only a negligible amount of direct current will flow through the capacitors 40 and 42.

The capacitors 40 and 42 are variable in capacitance in response to variations in the applied D.C. voltage and are preferably made of wafers of non-linear dielectric, such as barium titanate, sandwiched between two metal plates to which the D.C. voltage is applied. Alternatively, capacitors 40 and 42 may take the form of a reverse biased junction diode, neon bulbs surrounded by a pair of metal plates, or other devices known in the art to exhibit variations in capacitance in response to variations in an applied potential. It should be apparent that as the output voltage of amplifier 34 is caused to vary in response to temperature variations detected by the temperature sensing element 32, that the capacitance of capacitors 40 and 42 is proportionately varied. Accordingly, the capacitive effect of the span adjusting capacitor 28 and the zero adjusting capacitor 14 upon the bridge circuit is also varied in proportion to the temperature variations at the material. The potentiometers 36 and 38 may be adjusted to vary the magnitude of potential to be applied to capacitors 40 and 42 to determine the magnitude of compensation that these capacitors will impart to the zero and span adjusting capacitors.

Thus, by proper selection of the components in the compensating circuit relative to the zero and span adjusting capacitors and the anticipated amount of temperature variation to be present at the sensing capacitor 10, it is possible to continuously maintain a preselected zero and span setting for the bridge circuit irrespective of temperature variations at the moisture condition. When the compensation of the compensating circuit on the zero and span adjusting capacitors is exactly equal to the influence of the temperature variations upon the sensing capacitor 10, the output from the impedance bridge circuit will be a function of only the moisture variations being measured. Consequently, only the primary variable influences the measuring and/or controlling action of the impedance bridge circuit in that the output from the impedance bridge circuit is free of any errors due to variations in extraneous secondary variables.

The following is a table of values which were used in one embodiment of this invention utilizing a material web which would add to the capacitance of capacitor 10 from 50–55 micromicrofarads between its dry and wet condition and which had $$K_m = 0.1\%/°F. \text{ and } K_m \cdot \ln\frac{K_w}{K_m} = 0.4\%/°F.:$$

| Reference Numeral: | Value |
|---|---|
| 10 | 450 micromicrofarads. |
| 12, 16 | 0–1 micromicrofarads. |
| 14 | 0–450 micromicrofarads. |
| 28 | 0–200 micromicrofarads. |
| 36, 38 | 0–5000 ohms. |
| 44, 46, 48, 50 | 250,000 ohms. |
| 40 | 50 micromicrofarads Gulton Type NLD-4. |
| 42 | 100 micromicrofarads Gulton Type NLD-4. |

For the above illustrated embodiment, thermally responsive element 32 was selected to generate 30 microvolts per degree F.; the output of amplifier 34 was adjusted to approximately 30 millivolts per degree F. and resistors 36 and 38 were adjusted to produce an output of approximately 10 millivolts per degree F. and 20 millivolts per degree F., respectively. With these adjustments, the capacitors 40 and 42 were varied approximately 0.05 micromicrofarad per degree F. and 0.2 micromicrofarad per degree F., respectively, to maintain the output of the impedance bridge circuit substantially independent of variations in the temperature condition of the material web.

While only one embodiment of the invention has been shown and described, it will be apparent to those skilled in the art that many modifications may be made without departing from the scope of the invention as defined by the appended claims.

I claim:

1. A control device for measuring and/or controlling a first condition, the combination comprising an impedance bridge circuit including a variable impedance arm for unbalancing said bridge circuit in response to variations in said first and a second condition; means for adjusting the zero and span setting of said bridge circuit, said means including a first compensating impedance element; a sensing element providing an output signal in accordance with variations in said second condition; and means utilizing the output signal of said sensing element to cause said compensating impedance to change in accordance with said output signal to compensate the zero and span settings of said bridge circuit for variations in said second condition.

2. A control device for measuring and/or controlling a first condition, the combination comprising an impedance bridge including a variable impedance arm for unbalancing the said bridge circuit in response to variations in said first and a second condition; means for adjusting the span of said bridge circuit, said means including a compensating impedance element; a sensing element providing an output signal in accordance with variations in said second condition; and means utilizing the output signal of said sensing element to cause said compensating impedance to change in accordance with said output signal to compensate said bridge circuit for variations in said second condition.

3. A control device for measuring and/or controlling a first condition, the combination comprising an impedance bridge circuit including a variable impedance arm for unbalancing said bridge circuit in response to variations in said first and a second condition; means for adjusting the zero setting of said bridge circuit, said means including a compensating impedance element; a sensing element providing an output signal in accordance with variations in said second condition; and means utilizing the output signal of said sensing element to cause said compensating impedance to change in accordance with said output signal to compensate said bridge circuit for variations in said second condition including means for adjusting the magnitude of change in said compensating impedance for a given change in the output signal of said sensing element whereby the span of dependence on said second condition is varied.

4. A control device for measuring and/or controlling a first condition, the combination comprising an impedance bridge circuit including a variable impedance arm for unbalancing said bridge circuit in response to variations in said first and a second condition; means for adjusting the span of said bridge circuit, said means including a compensating impedance element; a sensing element providing an output signal in accordance with variations in said second condition; and means utilizing the output signal of said sensing element to cause said compensating impedance to change in accordance with said output signal to compensate said bridge circuit for variations in said second condition including means for adjusting the magnitude of change in said compensating impedance for a given change in the output signal of said sensing element.

5. A control device for measuring and/or controlling a first condition, the combination comprising an impedance bridge circuit including a variable impedance arm for unbalancing said bridge circuit in response to variations in said first and a second condition; means for adjusting the zero setting of said bridge circuit, said means including a first compensating impedance element; means for adjusting the span setting of said bridge circuit, said means including a second compensating impedance element; a sensing element providing an output signal in accordance with variations in said second condition; and means utilizing the output signal of said sensing element to cause said first and second compensating impedances to change in accordance with said output signal to compensate said bridge circuit for variations in said second condition.

6. A control device for measuring and/or controlling a first condition, the combination comprising an impedance bridge circuit including a variable impedance arm for unbalancing said bridge circuit in response to variations in said first and a second condition; means for adjusting the zero setting of said bridge circuit, said means including a first compensating impedance element; means for adjusting the span setting of said bridge circuit, said means including a second compensating impedance element; a sensing element providing an output signal in accordance with variations in said second condition; and means utilizing the output signal of said sensing element to cause said first and second compensating impedance to change in accordance with said output signal to compensate said bridge circuit for variations in said second condition, said means including means for independently adjusting the magnitude of change in said first and second compensating impedances for a given change in the output signal of said sensing element.

7. A control device for measuring and/or controlling a first condition, the combination comprising an impedance bridge circuit including a variable impedance arm for unbalancing said bridge circuit in response to variations in said first and a second condition; means for adjusting the span and zero setting of said bridge circuit, including compensating impedances which change in magnitude in accordance with a given electrical effect applied thereto; and means providing and applying said electrical effect to said compensating impedances in accordance with variations in said second condition.

8. In a control device comprising a bridge circuit including four impedance elements arranged in connecting arms, one of said four impedance elements being disposed to be responsive to variations in a first and second condition, another of said four impedance elements being variable to adjust the zero setting of said bridge circuit, a pair of impedances connected in series across the input terminals of said bridge circuit, an adjustable impedance connected between one of the output terminals of said bridge circuit and a common junction of said pair of impedances, a first compensating impedance variable in magnitude in response to variations in electrical potential applied thereto and connected in parallel with said adjustable impedance, a second compensating impedance variable in magnitude in response to variations in electrical potential applied thereto and connected in parallel with said another impedance element, and means operatively connected to said first and second compensating impedances for varying the electrical potential thereto in response to variations in the said second condition.

References Cited in the file of this patent

UNITED STATES PATENTS

| | | |
|---|---|---|
| 2,541,857 | Besselman et al. | Feb. 13, 1951 |
| 2,582,400 | Smith | Jan. 15, 1952 |
| 2,589,758 | Wojciechowski | Mar. 18, 1952 |
| 2,754,477 | Dunand | July 10, 1956 |
| 2,787,904 | Beard | Apr. 9, 1957 |

FOREIGN PATENTS

| | | |
|---|---|---|
| 625,024 | Great Britain | June 21, 1949 |
| 630,638 | Great Britain | Oct. 18, 1949 |